United States Patent
Salonen et al.

(10) Patent No.: US 7,684,551 B2
(45) Date of Patent: Mar. 23, 2010

(54) METHOD, MEANS AND A COMPUTER PROGRAM PRODUCT FOR MANAGING ONLINE CHARGING IN A COMMUNICATIONS NETWORK

(75) Inventors: Matti Salonen, Espoo (FI); Antti Romppanen, Kerava (FI)

(73) Assignee: Comptel Corporation, Helsinkl (FI)

( * ) Notice: Subject to any disclaimer, the term of this patent is extended or adjusted under 35 U.S.C. 154(b) by 23 days.

(21) Appl. No.: 12/153,668

(22) Filed: May 22, 2008

(65) Prior Publication Data
US 2008/0235161 A1 Sep. 25, 2008

Related U.S. Application Data

(63) Continuation of application No. 10/572,388, filed as application No. PCT/FI2004/000552 on Sep. 20, 2004, now Pat. No. 7,391,854.

(30) Foreign Application Priority Data
Sep. 18, 2003 (EP) .................................. 03396087

(51) Int. Cl.
*H04M 15/00* (2006.01)
(52) U.S. Cl. .............................. 379/114.2; 379/115.01; 379/121.01; 370/352; 705/7; 705/26
(58) Field of Classification Search ............ 379/114.01, 379/114.03, 114.05, 114.06, 114.08, 114.1, 379/114.12, 114.17, 114.2, 115.01, 121.01; 705/7, 26, 34, 37, 40, 52, 80, 412
See application file for complete search history.

(56) References Cited

U.S. PATENT DOCUMENTS
6,760,916 B2 7/2004 Holtz et al.
(Continued)

FOREIGN PATENT DOCUMENTS
WO WO-00/24161 A1 4/2000
(Continued)

OTHER PUBLICATIONS
ETSI TS 129 198-12 V4.0.0, XX, XX, Juen 2001 pp. 1-46, XP002219712, Section 5.1 to setion 8.4.

*Primary Examiner*—Binh K Tieu
(74) *Attorney, Agent, or Firm*—Birch, Stewart, Kolasch & Birch, LLP

(57) ABSTRACT

A method of online charging in a communication network. The method includes receiving a service request from a user, determining whether the service request is an access network session, a media network session or a service network session, determining if a type of charging model the user wants to use to provide the service request is an event based model, a volume based model, a time based model, an event based model or a combination of the models, determining which network element corresponding to the access network session, the media network session and the service network session in the communication network is responsible for providing the service request from the user, and provisioning identification rules for providing the service request to the network element that is determined to be responsible for providing the service request from the user. Further, the step of provisioning the identification rules comprises updating the rules when the access network session, the media network session and the service network session interact with each other in a charging transaction requested in the service request from the user.

42 Claims, 12 Drawing Sheets

U.S. PATENT DOCUMENTS

| | | |
|---|---|---|
| 2001/0023181 A1 | 9/2001 | Savolainen |
| 2001/0054115 A1 | 12/2001 | Ferguson et al. |
| 2002/0053078 A1 | 5/2002 | Holtz et al. |
| 2002/0082881 A1 | 6/2002 | Price et al. |
| 2003/0096592 A1* | 5/2003 | Moreau et al. ............... 455/406 |
| 2003/0152039 A1* | 8/2003 | Roberts ....................... 370/255 |
| 2005/0014483 A1* | 1/2005 | Lagerstrom ................. 455/405 |
| 2005/0021351 A1* | 1/2005 | Koskinen et al. ................ 705/1 |
| 2005/0136889 A1* | 6/2005 | Zackrisson et al. .......... 455/406 |
| 2006/0009193 A1* | 1/2006 | Bazzica ...................... 455/406 |
| 2006/0153074 A1* | 7/2006 | Hurtta et al. ................ 370/230 |
| 2006/0168303 A1* | 7/2006 | Oyama et al. ............... 709/231 |
| 2007/0130389 A1* | 6/2007 | Petersson et al. .............. 710/52 |
| 2007/0189300 A1* | 8/2007 | Bellora et al. ............. 370/395.2 |

FOREIGN PATENT DOCUMENTS

WO      WO-03/042885 A2      5/2003

* cited by examiner

METHOD, MEANS AND A COMPUTER PROGRAM PRODUCT FOR MANAGING ONLINE CHARGING IN A COMMUNICATIONS NETWORK

CROSS REFERENCE TO RELATED APPLICATION

This application is a Continuation of U.S. application Ser. No. 10/572,388 filing on Jul. 20, 2006, now U.S. Pat. No. 7,391,854 which is a U.S. National Phase application of PCT Application PCT/FI2004/000552 filed on Sep. 20, 2004, which all claim the benefit of European Application No. EP 03396087.3 filed on Sep. 18, 2003, the entire contents of all documents are hereby incorporated by reference.

BACKGROUND OF THE INVENTION

1. Field of the Invention

The present invention relates to a system and corresponding method for managing online charging in a communications network.

2. Description of the Related Art

Online charging methods are used, for example, for charging the non-voice services of prepaid customers, coordinating charging for a multimedia session between a mobile terminal and a remote host on both an application/media level and on an IP/access bearer level, and for minimizing credit losses caused by subscribers, while at the same time maintaining good performance of the system.

The traditional IN-based Prepaid Systems have been designed for charging the voice calls of prepaid customers. Today, prepaid subscribers form the majority of the total worldwide customer base and they want to be able to use the same services as the postpaid users. Until now, the lack of open, real-time charging solution has been slowing down the service deployment in prepaid environment.

Patent publication WO 02/37870 discloses one mechanism for coordinating charging for a multimedia session between a mobile terminal and a remote host on both an application/media level and on an IP/access bearer level. A token associated with the multimedia session is generated and used to correlate session charges for operations performed in the packet-switched access network and for operations performed in the multimedia system. However, the actual charging, and especially controlling the availability of services among the user session, is not described in the publication. Actually, the publication describes how to correlate different kind of events together in multimedia environment. These functions have been done equivalently for many years in conventional networks such as GSM networks.

Patent publication WO 02/67156 describes another method for control of billing in a communications network. The objective is to accomplish a mechanism for minimizing credit losses caused by subscribers, while at the same time maintaining good performance of the system. A gateway receives service requests and filters out the requests for which the analysis performed indicates that a credit loss risk is involved. For these service requests an in-advance credit check is initiated. If the credit check indicates that the delivery is permissible, a reservation is made for the amount of money corresponding to the service price, i.e. the said sum is reserved in the subscriber account so that said sum cannot be used by another service request in the meantime. When the service has been delivered successfully, the reservation is confirmed and the said sum is debited from the balance of the subscriber account. Otherwise, the reservation is cancelled. This publication concentrates to check the credit of subscriber and reserving money from the account of the subscriber when needed.

Drawbacks appear in the state of art when faster end user session management, especially charging, is required or desired. Operations requiring faster end user session charging can not be performed and operations desiring faster end user charging are performed inconveniently. An example of operations that require faster end user session charging is online service offered to an unknown client. An example of operation that is performed inconveniently is practical necessity to give one's credit card number to unreliable host for charging Internet purchases.

SUMMARY OF THE INVENTION

Accordingly, one object of the present invention is to address the above-noted and other problems.

Another object of the present invention is to is to provide an effective and interactive way to charge and control access and services provided by operators and services providers.

To achieve these and other object, the present invention provides in one aspect a method of online charging in a communication network. The method includes receiving a service request from a user, determining whether the service request is an access network session, a media network session or a service network session, determining if a type of charging model the user wants to use to provide the service request is an event based model, a volume based model, a time based model, an event based model or a combination of the models, determining which network element corresponding to the access network session, the media network session and the service network session in the communication network is responsible for providing the service request from the user, and provisioning identification rules for providing the service request to the network element that is determined to be responsible for providing the service request from the user. Further, the step of provisioning the identification rules comprises updating the rules when the access network session, the media network session and the service network session interact with each other in a charging transaction requested in the service request from the user. The present invention also provides a corresponding online charging system.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

For a more complete understanding of the present invention and the advantages thereof, the invention is now described with the aid of the examples and with reference to the following drawings, in which.

DETAILED DESCRIPTION OF THE PREFERRED EMBODIMENT

Figure 1:
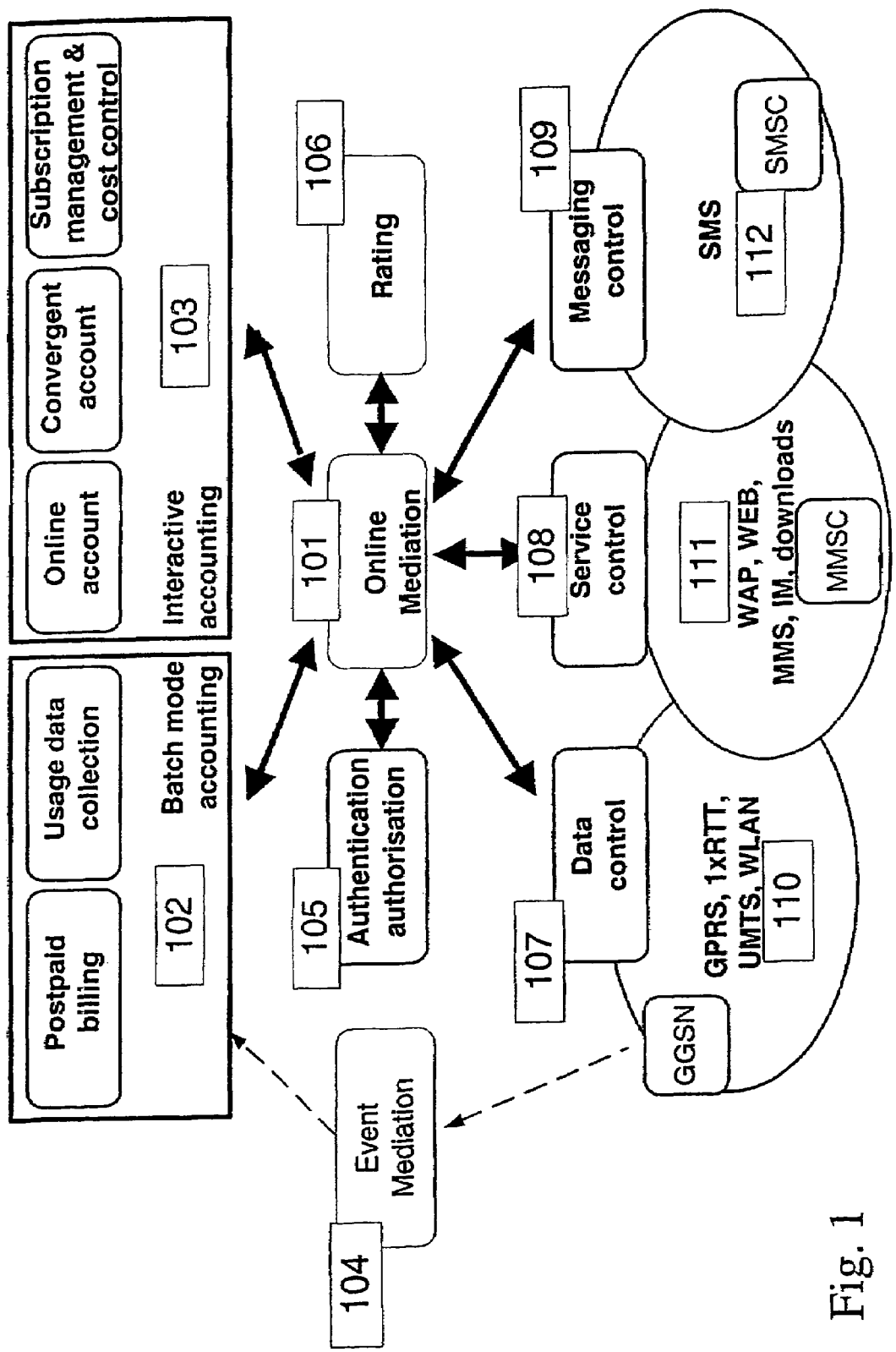
FIG. 1 presents a block diagram of an environment of an online mediation system with the network elements and operations and business support systems.

Reference will now be made in detail to the preferred embodiments of the present invention, examples of which are illustrated in the accompanying drawings.

Mediation is a process where usage data is collected from a telecommunication network and delivered to an operator's Operation and Business Support System (OSS/BSS). Mediation software collects usage data from the network by interfacing various different network elements. This mediation is divided in two main categories, namely real-time mediation and batch mode mediation. These mediation types of a flow of events made by subscribers and end users, called mediation process, are mainly unidirectional from network elements to OSS/BSS systems. In traditional mediation types there are generally no or few interactions between the network layer and OSS/BSS layer. Also any charging models and their variations and even provisioning new charging models to system are not presented in any of the publications discussed in the background of the invention.

Further, online mediation provides operators and service providers very flexible tools for charging and controlling data, messaging and service usage. As a significant advantage, it enables a real convergent mediation with both post-paid and prepaid charging models. The concept of the invention fits especially for all non-voice services, however the present invention is not limited to them.

It has been often recognized that in most countries the average revenue per user (ARPU) is lower for prepaid than for post-paid customers. There are many reasons behind this, but the single most important one seems to be quite straightforward: there are simply more services and pricing models available for post-paid customers.

This is especially evident with non-voice services, such as GPRS, WAP and MMS. These services are expected to increase the average revenue per user in the coming years. However, many operators are facing serious challenges when offering these services for their prepaid customer base.

Current network infrastructure and prepaid systems have certain restrictions in terms of non-voice charging. For instance, legacy prepaid systems were designed only for voice charging. And by default, non-voice network elements do not include pre-delivery control required in the prepaid charging.

The present invention is intended to create an online charging method for an end user session including at least one first charging session and at least one second charging session. One practical target of the present invention is to create an interactive online mediation method, system and computer program product for charging and controlling sessions online made by subscribers and end users. The target is achieved, for example, by identifying the requests from different types of networks and combining them under a charging rule cache mechanism. The charging rule cache is associated with an end user session. Charging transactions corresponding to a certain charging session are synchronized so that versatile charging models can be offered. These can include, for example, pure volume or pure event based charging for all the services and accesses. According to an embodiment of the present invention, there is also provided a computer program product for running an online mediation system, which computer program product includes computer program for controlling the operation of the online mediation core component and the network layer control components.

A product based on the invention, Comptel Online Mediation, was built to meet the emerging challenge of performing true prepaid charging for non-voice services. It enables operator to unify the non-voice service offering and charging models for pre- and post-paid customers. The present invention enables an open and generic charging infrastructure, which supports virtually all access and service networks as well as different payment systems (OSS/BSS).

The present invention is based on using a combination pricing plan as response to a number of different charging requests, and determining the charging by the combination pricing plan, by using, during the end user session, different proxy components to identify service requests according to different service identification request rules, each proxy component using individual service identification rules.

Considerable advantages are gained with aid of the present invention. Operators can provide versatile charging models, end users can be informed of the actual cost of service purchase and credit losses can be controlled. Further, chargeable online service can be offered to an unknown client. It is not practically necessary to give credit card number to an unreliable host for charging Internet purchases.

Arrangements for managing end user session online charging are presented. Furthermore, an embodiment of the present invention gives an actual solution how subscribers can be charged and served with an online mediation system. This is an inventive step in comparison to the two publications, mentioned earlier, where it is told generally the environment of the field of technology, but not the actual solution how subscribers are going to be charged and served with any real online mediation system.

One embodiment of the present invention online charging is performed in a system independent online mediation system. Another embodiment of the present invention is related to the charging of non-voice services. However, the present invention is not restricted to this area and can be used to charge for any type of networks and services. It aims to provide a complete set of charging models and capabilities. These are obtained by combining and managing access, media and service level charging under a pricing plan mechanism which enables the changing of charging rules within an active charging session. Furthermore, an embodiment of the present invention enables the provisioning of service identification rules to the network layer control nodes or proxy applications.

Another embodiment of the present invention makes it possible to construct a reliable online mediation system and method with effective control of services and fraud prevention. The inventive concept allows also several useful and advantageous embodiments, which provide further advantages.

An Example According to the Environment Picture of FIG. 1

An embodiment of the present invention interfaces to different control nodes to enable online charging and control of resource and service usage (101). The control nodes include Data Control, Service Control and Messaging Control elements.

With reference to FIG. 1, data control (107) covers access and media related charging. Data Control can be implemented by several solutions. One of these is a proxy component operating on the GPRS backbone (Gn interface). This proxy can handle GPRS access monitoring and control, and also GPRS sessions. An alternative solution is an IP Proxy located outside the GPRS network—either directly after GGSN (Gi interface), or more generally in operator's IP network. IP Proxy, however, does not have access to the GPRS access data and GPRS sessions.

Data control with access monitoring and GPRS session control can also optionally be implemented with an intelligent GGSN, which provides data control and charging for GPRS access. Some SGSN vendors also provide support for CAMEL3 directly from their SGSN. CAMEL3 solutions and intelligent GGSNs generally provide bulk volume based charging, where no protocol-specific charging is possible. However, APN (Access Point Node) differentiated charging is in some cases possible.

Also other control nodes can exist. For example, session control for SIP sessions can be implemented by another node. Also with RADIUS or Diameter protocol it is possible to control user sessions. The system can alternatively act as a RADIUS or Diameter or proxy server for external applications. In this case it acts as the authorizing element for the sessions, and possibly also for the service transactions.

Service control (108) can be implemented by intelligent proxy applications that support the charging of any type of HTTP traffic like MMS, browsing and downloads. Chargeable services can be operator's own, provided by a 3rd party partner or dedicated services on the public Internet. The invented system provides interfaces for trusted external services to access the service charging and control functions. These services can be, for example, external content services or charging transactions from external network elements such as WAP GW or MMSC. This requires, however, intelligence from the external service to authorize and report transactions.

Messaging control (109) handles SMS charging and control. Messaging control is performed using SS7 capable components that captures messages, and performs charging and authorization for the person-to-person, person-to-application and application-to-person messaging in real-time.

An alternative solution for application-to-person or person-to-application message charging and control is to interface directly from an SMS application to the invented system. These trusted applications must contain some intelligence to authorize and report the service transactions.

Additionally to service control nodes, the Online Mediation environment usually involves also additional interfaces to different kind of business support systems. These can be different type of directories or data processing applications that are used to query for information or enrich it. With reference to FIG. 1, two different type of business logic support systems are presents as examples:

Authentication and authorization (105) can either be done in the network layer by controlling nodes or they can be performed by the invented system. In the latter case, the system would directly interface to these services. Authentication is used to identify the user and enable the correct business logic. User authentication may require, for example, interfacing to an external authentication service, such as a RADIUS or Diameter server.

Once the user is reliably identified, the user profile for charging can be fetched from internal or external database. The user profile defines for example the user subscription method, allowed services and account location. Service authorization defines whether the requested action is allowed to proceed. For example, users may have restrictions on certain services due to the nature of the service or content.

Build-in rating capabilities include simple rating rules such as volume rates for certain protocols, and event rates for example an MMS or SMS message. More complex rating models, such as discounts, are provided by an external rating (106) component. The purpose of Online Mediation is usually to provide a way to charge for the service usage in some network (110, 111, 112). Online mediation layer can be associated with Batch mode and Interactive accounting. However, the latter is where the power of online mediation can be utilized.

Batch mode accounting (102) is provided for post-paid subscribes. This includes resource and service control and authorization and enables for example the blocking of unauthorized services, as well as cost control applications. Interactive accounting (103) can be provided for both post-paid and prepaid customers. This includes enhanced resource and service control and authorization and enables, for example, the blocking of unauthorized services, as well as cost control applications.

Interfacing towards a prepaid account requires interactive accounting. It includes the reservation, deduction based on confirmation as well as the canceling of a reservation. The usage information can also be used for usage data reporting.

Figure 2:
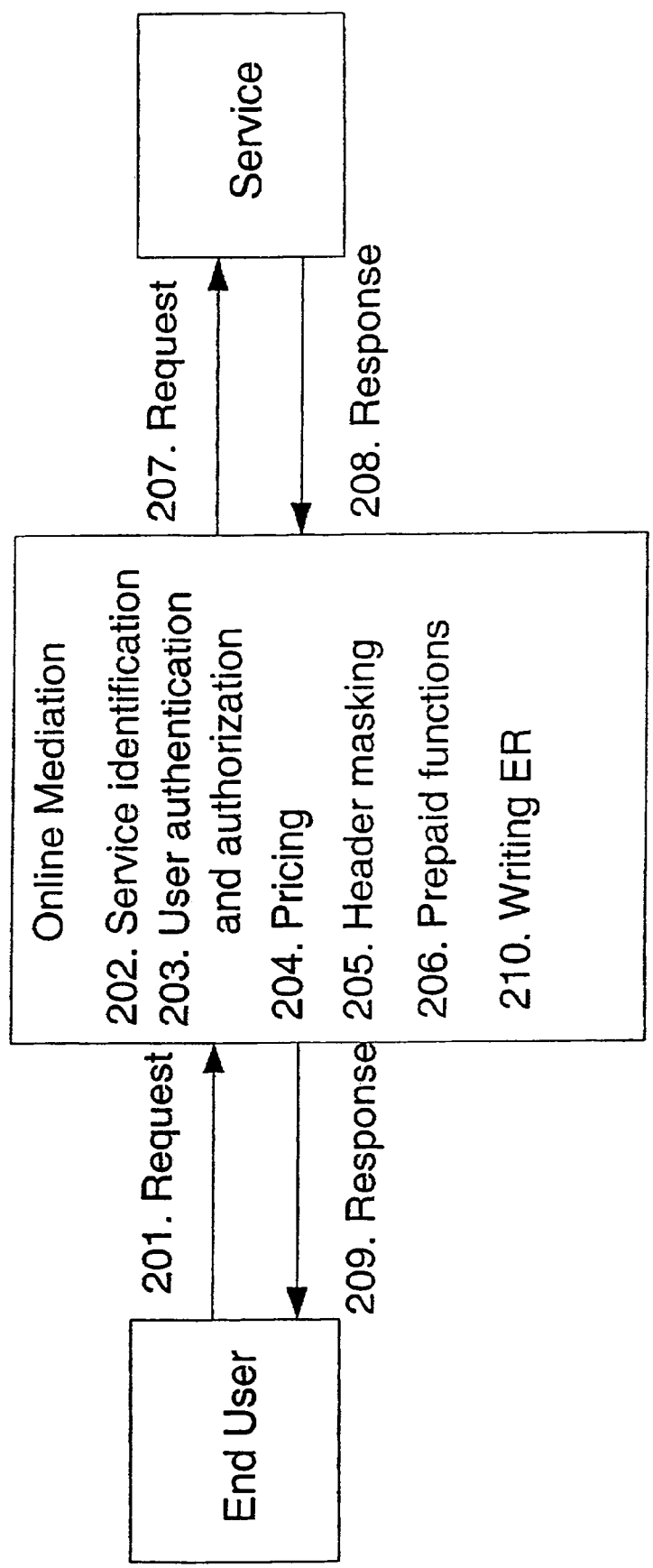
FIG. 2 presents an example of an Online Mediation functionality used in the prepaid charging of non-voice services.

Online Mediation Functionality According to FIG. 2 Depicts an Example of how an End User Accesses Content Services Through Online Mediation when Using Prepaid Services Online Mediation is a term used for the interactive connectivity of transactions in the different type of network elements to business applications in various business support system environments. Interactive connectivity enables the inclusion of online mediation functionality within each transaction. It means, for example, that end users can be authorized before they open data sessions or download premium services.

The term online is frequently mixed with descriptions about real time functionality, and more precisely with event mediation (104). Real time means that a transaction in some network elements activates some real time functionality, for example, in a mediation layer at the very same instant as the transaction has occurred. However, real time solutions do not provide any way for intercepting the transactions in the network elements. The transactions will proceed normally and they can only be associated to the activated real time functionality. A more strict definition for real time specifies a guarantee of a time window within which the real time functionality is activated.

The numbers in the FIG. 2 show the order of the sequences within the transaction. First, the end user requests a service (201). Online mediation identifies the requested service and authenticates and authorizes the end user (202). Online mediation uses an external authentication system for the authentication (203).

Next, Online mediation prices the service (204). When a service request is sent to the content server, an identifier can be sent in the service's request header. The original user identifier is supplied by the WAP gateway device, and it can be, for example, the end user's MSISDN. This user identifier can show the end user's identity. If the original user identifier does not want to be sent to the content server, Online mediation can mask it (205). After masking, the user is not visible to the content server.

Online mediation can generate a user identifier or obtain one from an external authentication system. This identifier does not show the end user's identity. When the end user pays through a prepaid account, the balance of the prepaid account is checked. If the prepaid account can be charged, the account value is reduced by the correct value (206). Next, Online mediation requests (207) the content server to deliver the ordered service to the end user (208 and 209). As the last step of the transaction, Online mediation writes an event record of the transaction (210).

Figure 3:
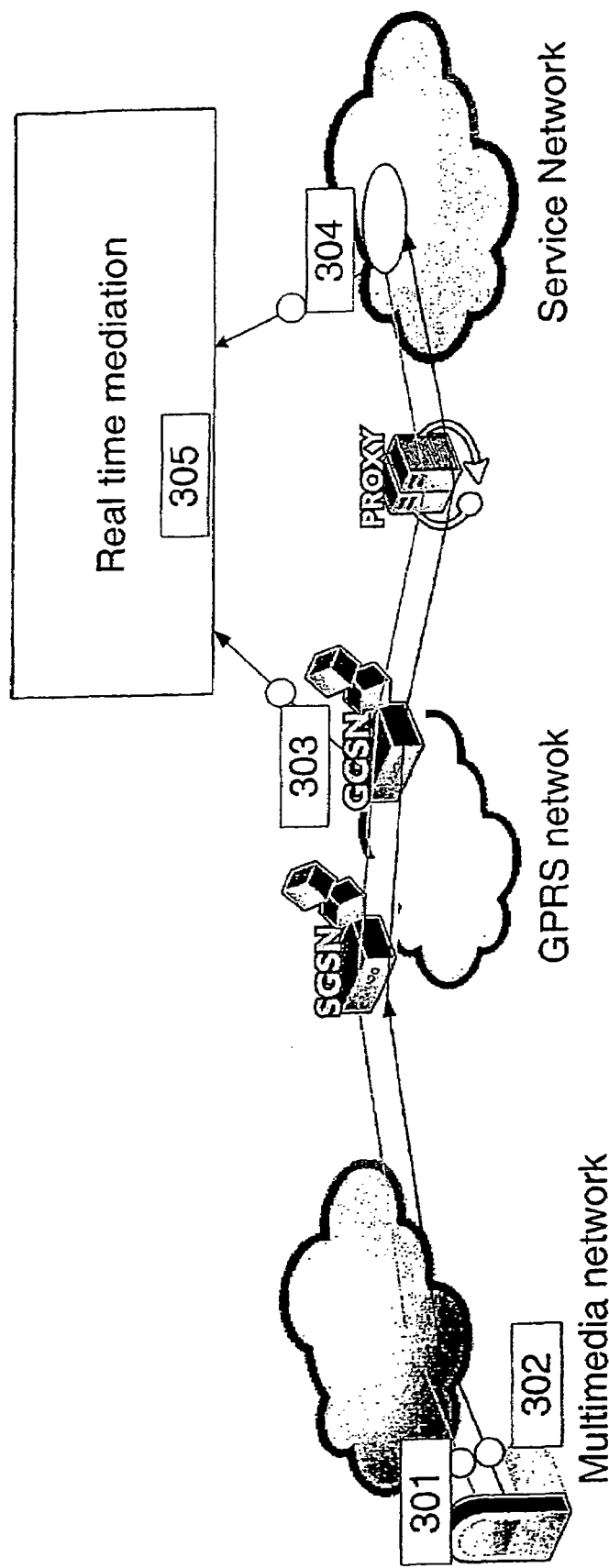
FIG. 3 presents an example of a real-time mediation functionality.

An Example of a Real Time Application is Depicted in FIG. 3

FIG. 3 illustrates a typical non-voice service network arrangement where a service request is initiated with a mobile terminal device (301). A request generates one or several token(s) (302) (as described in publication WO 02/37870) that are delivered via different types of channels. One token can be associated with a session between the terminal device (301) and service application (304). Another one can be associated with some particular service request.

It is the nature of real time mediation applications that there are active listeners or probes in the network, constantly monitoring the traffic. In this example, a GGSN node (303) acts as a real time billing mediation probe. All the traffic goes through it and it keeps routing it further to IP network. At the same time, it collects traffic data to a real time mediation device, which can utilize it for billing or reporting purposes. The example also involves another active network element. The service application (304) itself generates log files that can be collected to the mediation device in real time. Both of these network elements (303, 304) continue processing the service requests as they come, the additional data (including the tokens) delivered to mediation layer (305) is yet to be processed and the network element's operation is not linked to this mediation process in any way. This is basically what is meant with real time mediation. It involves the collection of event records from the network in real time and separates the mediation layer processing from the network layer processing.

One should notice that the above-described example includes a very powerful method for pricing a service. The tokens described in the example can be correlated in the mediation layer and it is possible to combine the charging of multiple request channels to a single charging request.

Building Charging Models

The invented system aims to provide operators with flexible tools for charging. Charging model defines how a price is determined for a content service at a specific time, for a specific service and for a specific end user. Charging model information id separated from the general information of the service and each service can only have one valid pricing model at a time.

Charging Model Building Blocks

Price Source Location:

There are at least five different price source locations. These are: service request, content service, pre-paid system, internal database and external rating engine. The original price information is fetched from these locations. However the unit type and unit size, which are used to specify the price values, are always specified in the internal database.

Price Types:

There are at least four different price types. These are: free of charge, item based, time based and volume based. Content specified with a 'free of charge' price type is not charged, but an event record is still created for audit trail purposes. 'Item based' means that each incoming content request is charged as a full entity. 'Time based' or 'volume based' price types are meant for streaming content. Here the unit type and unit size play an important role. For example a price for a video clip could be specified as 2 €per second or it could be 3 €per 100 kilobytes. Different price types can be created according to the capability of control node applications.

Tariff Class:

Tariff class is a place for a price. One tariff class can be associated to several content. That is, when adding new content to the system, the operator user selects the desired tariff class for the content. The price for the tariff class is specified earlier through the Management System.

Tariff classes are specified in the internal database. The price values related to a tariff class can reside in the internal database or they can be fetched using an external rating engine. Therefore, a tariff class definition overrides price source locations: content request, content service. Tariff classes and Price types can co-exist. Therefore tariff class definitions must also contain unit type and unit size definitions.

Price History and Change Management:

The prices for different content tend to change. In many countries, the law defines that the user must know the price information. Therefore, the time when the price changes must also be a specific time. Price history and change management covers this type of functionality. There is a possibility to define a validity period (dates and time values) for 1 ... n price values in the internal database and only one price value can be active at a time. Price history and change management is valid only for price source location: internal database.

Calculation Rules:

Simple rating functionalities are called calculation rules. These include, for example, the calculation of the number of MMS message recipients or calculating the total price of volume based price type with 1€ per minute unit type and three minute download time.

Examples of Charging Models

Item Based:

Item based charging means that the service request is mapped to a one-time price through tariff class mechanism. No additional rules are needed to define the final price.

Item Based with Calculation Rules:

This means that the service request is mapped to a one-time price through tariff class mechanism. In addition to this the pricing model defines the rules that are used to calculate the total price. An example of this is sending an MMS message to multiple recipients. The price defined through the tariff class is per message recipient. The calculation rule is: count the number of recipients from message headers and multiply the item price with that.

Volume Based, Basic Calculation Rule:

In this model, the price is defined per measurement unit (e.g., kilobytes) through the tariff class. The calculation rule is simple: Multiply the volume of the request with the price.

HTTP POST request includes the message size in Content Length header field and it is defined as kilobytes. HTTP GET request is more complicated, because the content length of the request message does not include the requested content size. If the payment reservation is required, we need to get the content length before the requested content is delivered to the end user. We have the following options to perform this:

Omit the payment reservation step, forward the request to the content server, receive the response, calculate the total price from the content length—parameter and make the payment deduction from the prepaid account. If the deduction failed, the content is not delivered to the end-user.

Make an additional HTTP HEAD request (with the header fields from original message) to the content server. The response to this message includes the real content length. So the total price can be calculated and payment reservation step can be performed.

Volume Based, Complex Calculation Rule:

Otherwise this is the same than the previous model, but the calculation rule is more complex. The price can be defined through steps, e.g.:

0 to 100 kilobytes=0.01 Eur/kilobyte
100 to 500 kilobytes=0.02 Eur/kilobyte
500 to 1000 kilobytes=0.03 Eur/kilobyte
over 1000 kilobytes=0.04 Eur/kilobyte It is recommended, that the external rating used is used in this case.

Subscription Based Charging Model:

When the service is subscription based, the payment for the service is made in advance. We need an external subscription service system to check the subscription validity. The subscription can be based on time (validity period is checked) or number of usage (Subscription includes a usage counter that is deducted by one for each request. When the counter is zero, the subscription is not valid any more).

When the service requested is identified as subscription based, no payment reservation or deduction steps are performed. Instead of these Check subscription validity—operations are performed towards the external subscription system. If the response is OK the normal delivery steps are performed.

Combination of Subscription Based and Item/Volume Based:

This charging model means, that first the subscription validity is checked against the external subscription system and if response is OK the steps for item/volume based pricing are done and payment reservation/deduction steps are performed when needed.

Subscription Based Charging Model:

Subscriber based pricing is always performed by the external rating system. The rating request includes MSISDN and Service Id as parameters. The rating system calculates the price according to the predefined rules and returns the total price to system e.g. e- or m-commerce platform. It is assumed that the e- or m-commerce platform and Rating system uses the same currency.

Session and Charging Rule Management:

Session and charging rule management handles the user charging session data management, as well as the charging rule selection. User charging session is opened for example when the user creates a GPRS session. The charging session opening results in an initial balance reservation to authorize the session creation.

All charging transactions inside this session are synchronized so that also complicated charging models can be realized. The synchronization is performed by the business logic and charging model synchronization layer. When a charging transaction takes place, the session management transfers the transaction to the business logic, and the business logic processes the transaction. The business logic returns an updated charging rule in the charging rule cache, or alternatively advises the session layer to release the end user session (and also instruct the control nodes to disconnect the user).

With pure event charges from external platforms, where access or media related charges are not necessarily related—a charging session can be opened, and closed immediately as soon as the event delivery is confirmed by the control node.

Figure 4:
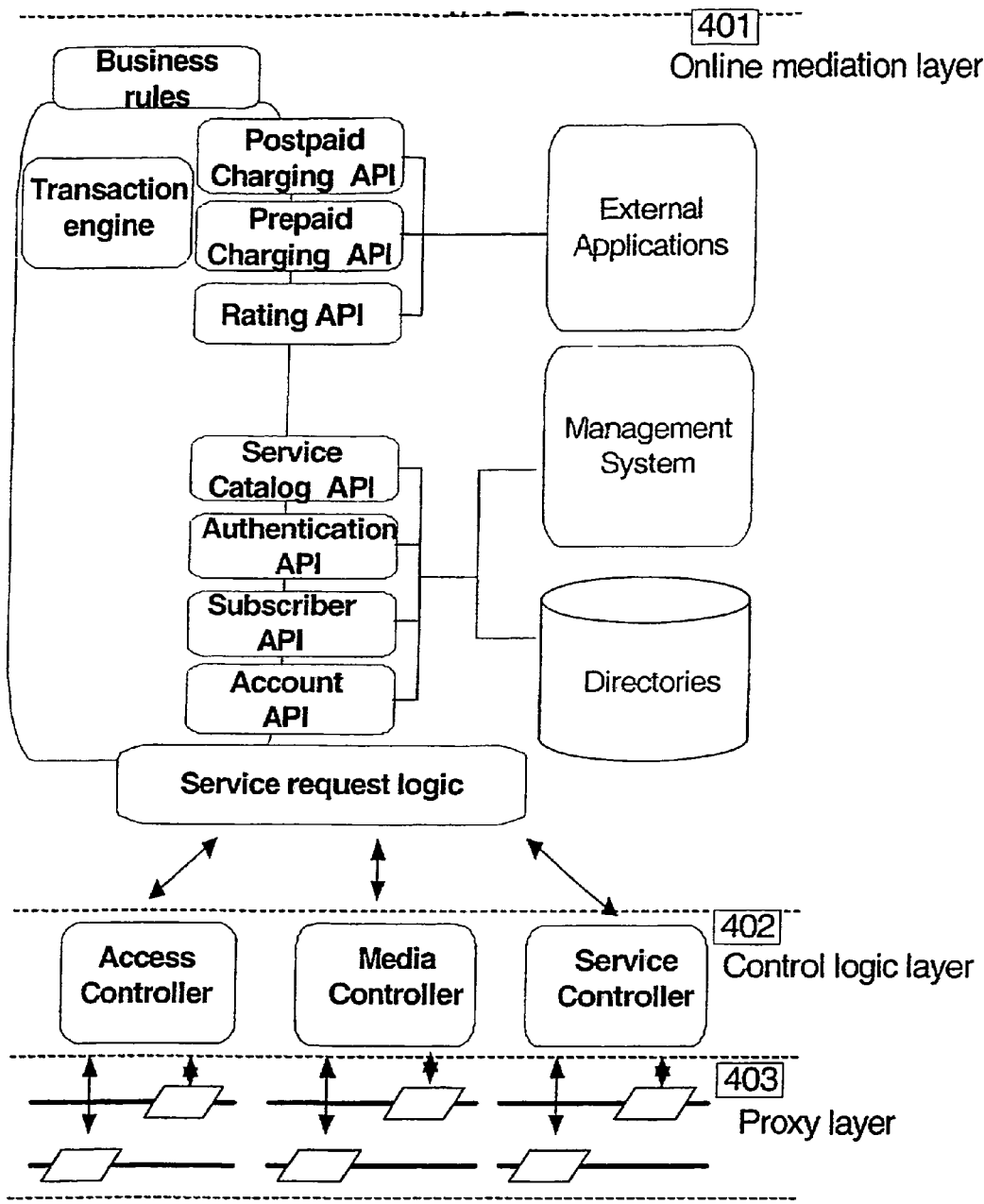
FIG. 4 presents a block diagram of layers connected with the online mediation system in a framework according to an embodiment of the invention.

Online Mediation Device According to FIG. 4

In an embodiment of the invention shown in FIG. 4, the system has several functional layers, and the online mediation system provides an adaptable online charging interface layer towards Proxy layer (403), which includes different types of control nodes or proxy applications. The control components (402) recognize the chargeable data and service flows in different networks and technologies and trigger charging events for the online mediation core (401) to process.

As is apparent from the above disclosure, the present invention can be applied in a great variety of applications requiring reliable charging and controlling of subscribers in various communication networks and technologies.

Figure 5:
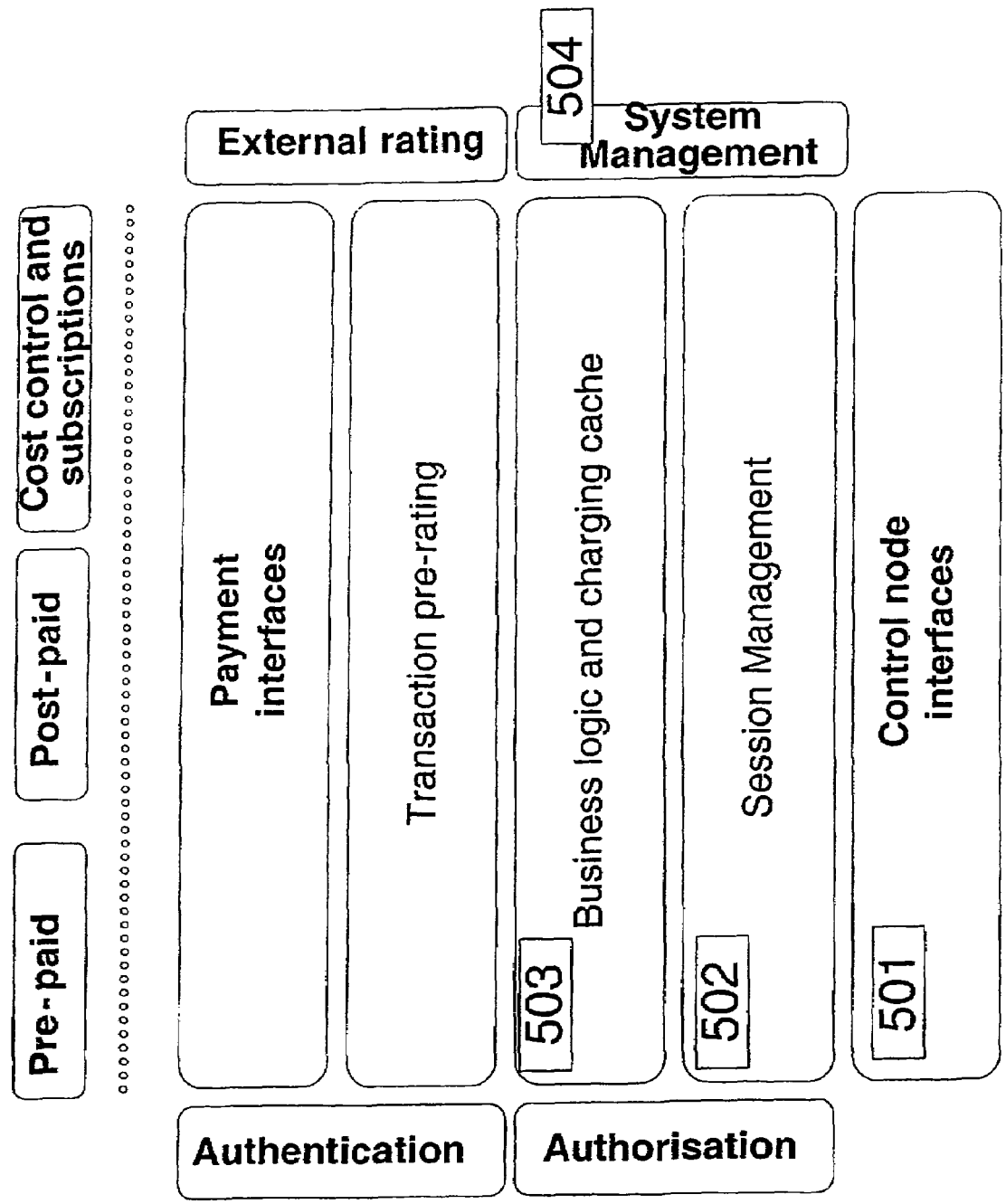
FIG. 5 presents a block diagram of the online mediation layer in more details of a framework according to an embodiment of the invention.

Online mediation layering according to FIG. 5

With reference to FIG. 5, Online Mediation includes different layers of functionality. This embodiment of the present invention is associated mainly with Control node interfaces (501), Session management (502), Business logic and charging rule cache (503) functionality as well as System Management (504).

The invented system operates by accepting charging requests from the controlling nodes in real-time. The communication between system and control nodes is interactive, providing a request-response method of communicating. Control nodes request permission and authorization for a transaction from the system. The request can be, for example, the following:

Request permission for certain access volume with certain service type; and

Request Permission for Certain Message or Download Transaction.

The control nodes perform the initial traffic classification into service types, and perform elementary data aggregation. This helps to reduce the traffic required between the control nodes and the system. In addition to the above-mentioned requests, the information received from control nodes can be also for example a notification that the user is now roaming.

Control node interfaces layer (501) hides the different control nodes from the Online Mediation core (502 and 503). It provides the different protocol adaptations between the different control nodes, and the internal representation of charging transactions. A common API internally represents all charging transactions from different controlling nodes.

Session and charging rule management (502) handles the user charging session data management, as well as the charging rule activation. User charging session is opened, for example, when the user creates a GPRS session. The charging session opening results in an initial balance reservation to authorize the session creation.

All charging transactions inside this session are synchronized so that also complicated charging models can be realized. The synchronization is performed by the business logic and charging model synchronization layer. When a charging transaction takes place, the session management transfers the transaction to the business logic, and the business logic processes the transaction. The business logic returns an updated charging rule cache to the session layer, or alternatively advices the session layer to release the user session (and also instructs the control nodes to disconnect the user).

With pure event charges from external platforms, where access or media related charges are not necessarily related—a charging session can be opened, and closed immediately as soon as the event delivery is confirmed by the control node.

Business logic and charging model synchronization (503) enables for example pure event-based charging for MMS and content. When a user downloads an MMS message or a Java game, the charging requests related to the access and service usage are synchronized. The access usage related to the service transaction is zero-rated, and the event charge is allocated for the transaction. The charging rule cache management makes it possible to synchronies the charging requests from different control nodes.

The charging model principles include the following aspects:

Which of the charging components the operator want to use (access/media/service) for charging;

What kind of charging model the operator wants to use within each component (subscription based/volume based/time based/event based/combination of previous models);

Which component is responsible for charging of which services; and

Does the charging of the service in one component affect to the charging in other component.

Definitions

Online mediation: Online Mediation term is used for the interactive connectivity of transactions in different type of network elements to business applications in various business support system environments. Interactive connectivity enables pre-delivery charging functionality. It means end users can be authorized before they can for example open data sessions or download premium services. Fraud-free prepaid charging is probably the most evident example of pre-delivery functionality of online mediation. In online mediation environment the network elements and payment systems have interaction between each other's.

Traditional mediation (both real time and batch mode): Mediation is a flow of events made by subscribers and end users. The mediation process, either real time or batch mode, is mainly unidirectional from network elements to OSS/BSS systems. In traditional mediation types there are generally no or few interaction between the network layer and OSS/BSS layer and therefore e.g. pre-delivery function is not implementable.

End user session: A session within the system that associates an end user to some resources. This can include several types of service usage sessions.

Service usage session: General term for the service usage event experienced by the end user. This can include several types of charging sessions. Within one service usage session there can be several similar and/or different charging sessions connected with each other's.

Charging session: A session related to one proxy application. Charging session is a common description on event information made by ends users. Charging sessions contain various kind of information such as identification of end users, start and stop times of service, pricing information, etc. Examples: access session, service session, media session.

Access session: A session related to access proxy application.

Media session: A session related to media proxy application.

Service session: A session related to a service proxy application.

Charging request: Charging request is the embodiment of a charging model. It is the actual request made towards a charging service such as a prepaid or postpaid account.

Charging model: Charging model defines how end user is charged for the service usage. Charging model can be a simple item based model or it may include several charging rules related to duration, volume etc.

Charging rule: Charging model consists of charging rules and their combinations. Examples of charging rules are item based or volume based.

Charging rule cache: Charging rule cache includes the charging rules that represent the identified charging model. Charging request is build according to the rules in charging rule cache.

Smart proxy: A proxy application that is able to identify service request according to some rules that have been provisioned to it.

Figure 6:
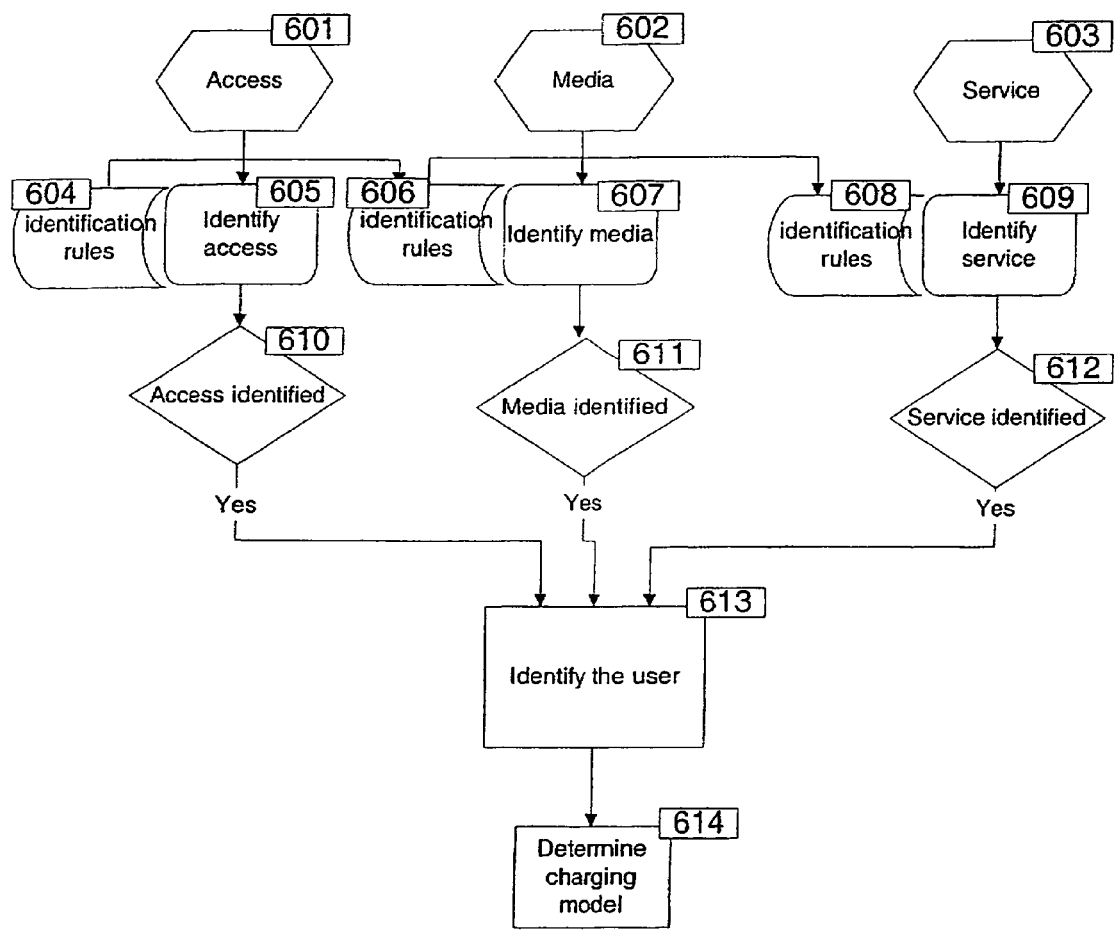
FIG. 6 presents a flow diagram of service request identification according to an embodiment of the invention.
Figure 7:
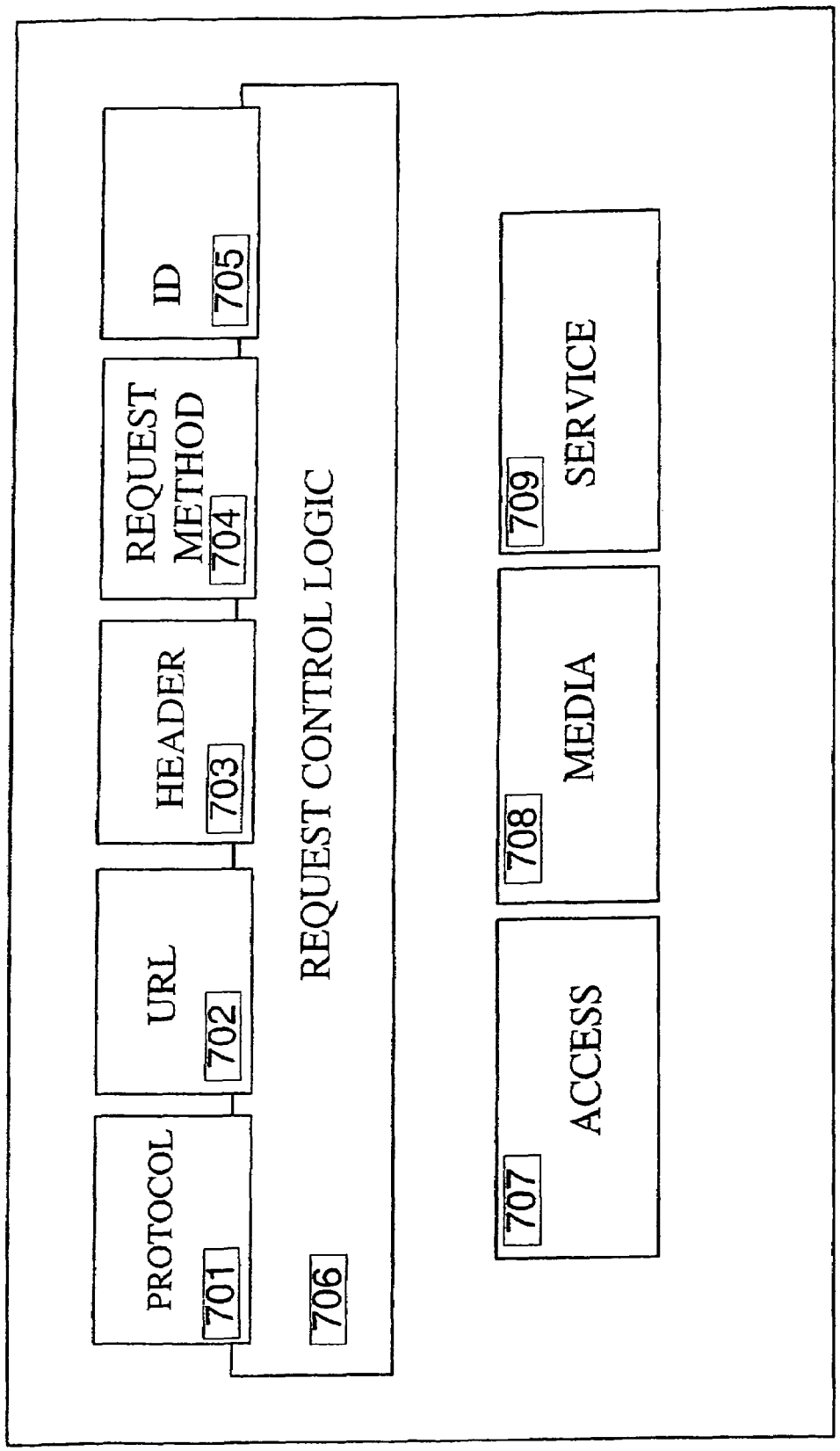
FIG. 7 presents entities used in a service request identification according to an embodiment of the invention.

From an end user's point of view, an embodiment of the present invention is experienced in an accurate pricing model for service requests. The end user requests some service from a content server that locates behind the system functionality. More precisely, the system interfaces to one or more proxy application or service control components that hide the content servers from the end user. FIGS. 6 and 7 depict the service request identification within the proxy layer.

Service Request Identification

Figure 11:
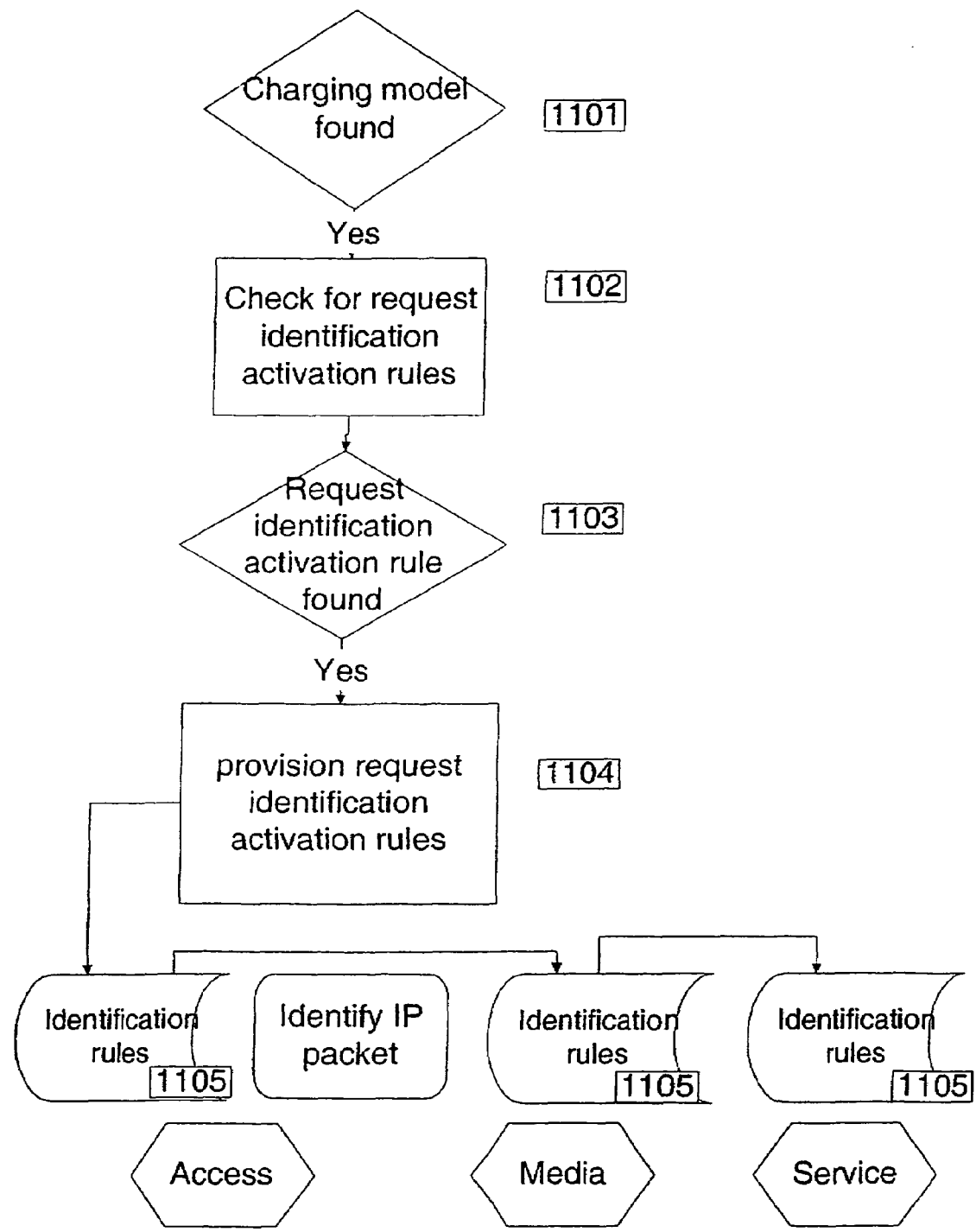
FIG. 11 presents a flow diagram of an identification rule provisioning method according to an embodiment of the invention.
Figure 12:
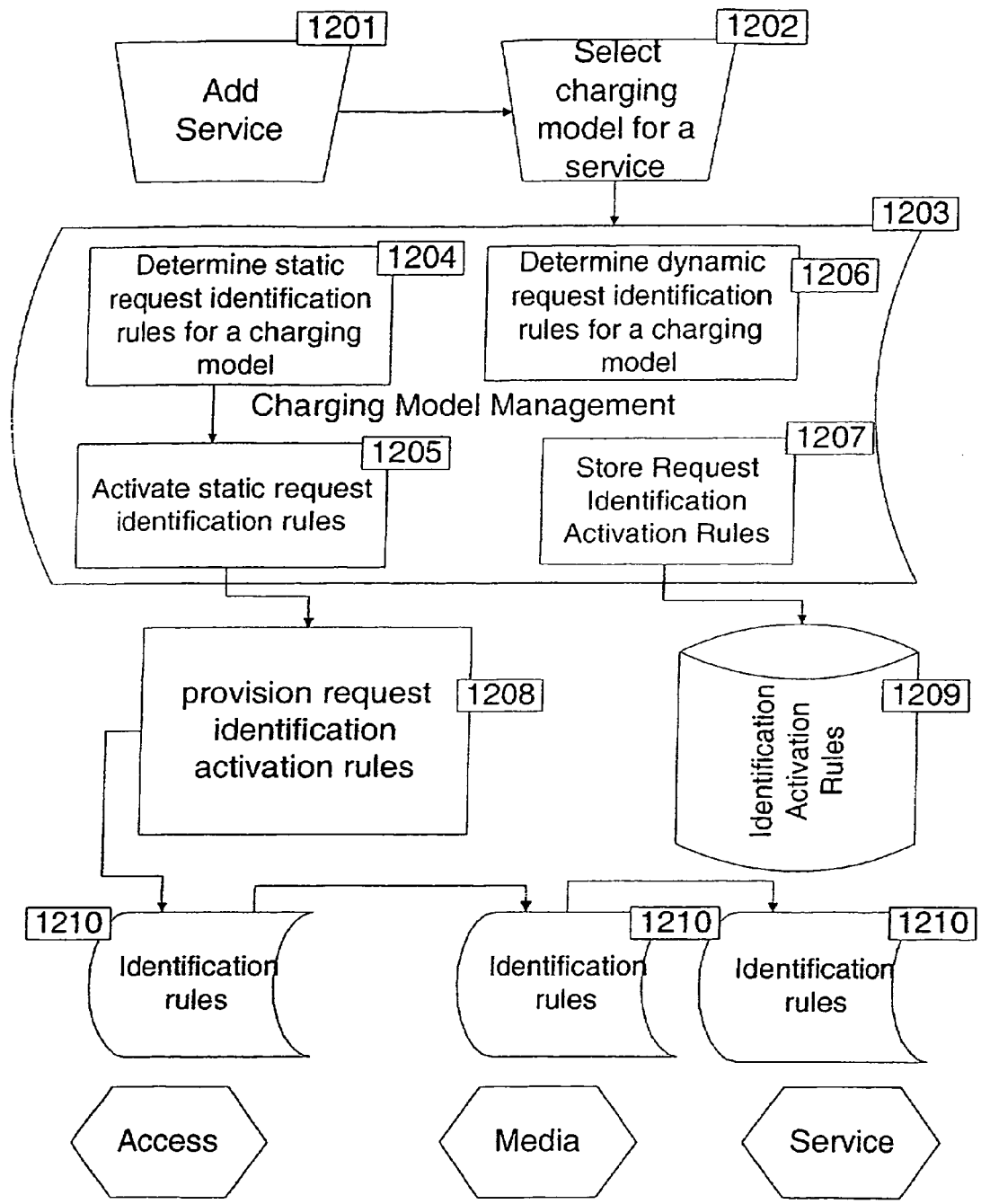
FIG. 12 presents a flow diagram of an identification rule management method according to an embodiment of the invention.

Proxy applications examine the received service request according to service identification rules that have been provisioned to them according to description with reference to FIGS. 11 and 12. If the end user's service request matches the service identification rules in any of the proxy components, an end user session is initiated within the system.

Service Request Identification According to FIG. 6

FIG. 6 depicts the steps for identifying a service request and how an end user session is initialize within the invented system. It should be noted that a service request is understood as a combination of different type network requests invoked by an end users service request. For this reason, the invented system can utilize different types of proxy components for different functional areas.

Access level request identification relates to examining the IP packets that flow to or from the content server. Media level request identification refers to opening a service session such as GPRS or WAP connection. From now on, term service usage session is used whenever referred to session that a user experiences when requesting for a service. Term end user session is used when referring to the session within the described system. With service level request identification it is understood that services are identified in application level. For example, a service request is identified based on specific URL.

Service Request Identification Entities According to FIG. 7

With reference to FIG. 7, a request identification can be based on attributes found in the functional areas of access (707), media (708) or service (709). The attributes can be related to protocol (701), URL (702), Header information (703), request methods (704) or other identifiers (705). These are called Service Request Identification Entities. Request control logic (706) is able to parse and match any type of entities that are included in the service requests. Request identification rules can include one or several entities and/or any type of combination of them.

Again with reference to FIG. 6, request identification can be done in one or several proxy components as well as in the request control logic within the invented system. What this means is that a service request by an end user may include several different type of network level service requests that need to be identified. The actual implementation and request identification locations depend on the deployment environment in the sense of what types of proxy applications are available.

In case the proxy application is a smart gadget and it is able to identify request very accurately, only minimal request identification information will be sent within the interface message. This could be some keyword or id number that is linked to charging model identification rules within the system. On the other hand, if the proxy application is simple, the interface message will include detailed information about the service request. In this case the system will try to identify the request according to procedure described in FIG. 7.

It is also possible that there is need to further narrow down the service identification done by a smart proxy. In this case the service identification is also done according to procedure described in FIG. 6. It should be noted that the smart proxy scenario is more desirable in terms of performance since processing is done close to the information source and only adequate data is delivered to the system.

With reference to the flow chart presentation of service request identification in FIG. 6, the identification procedure begins with the identification of a single service request from different type of network services (601, 602, 603). The first service request can be initiated from any of these network service areas. Steps 605, 607 and 609 describe that each network service area has its own service identification procedure. This can be located in proxy components or alternatively within the core of the invented system. Items 604, 606 and 608 represent the request identification rules. These relate to the FIG. 7. Request identification rules are formed of the Request Identification Entities. Also, FIGS. 11 and 12 illustrate more accurately the provisioning of service identification rules and how the rules in proxy application are linked to different charging models. Once one of the service requests (601, 602, 603) is identified the system begins to identify the end user (step 613). This includes the checking of whether the end user has an active end user session. If such is found the end user session information is used for the upcoming steps. After the user is identified, the system starts determining a correct charging model for the service (step 614).

User Authentication and Service Charging Session Synchronization

Figure 8:
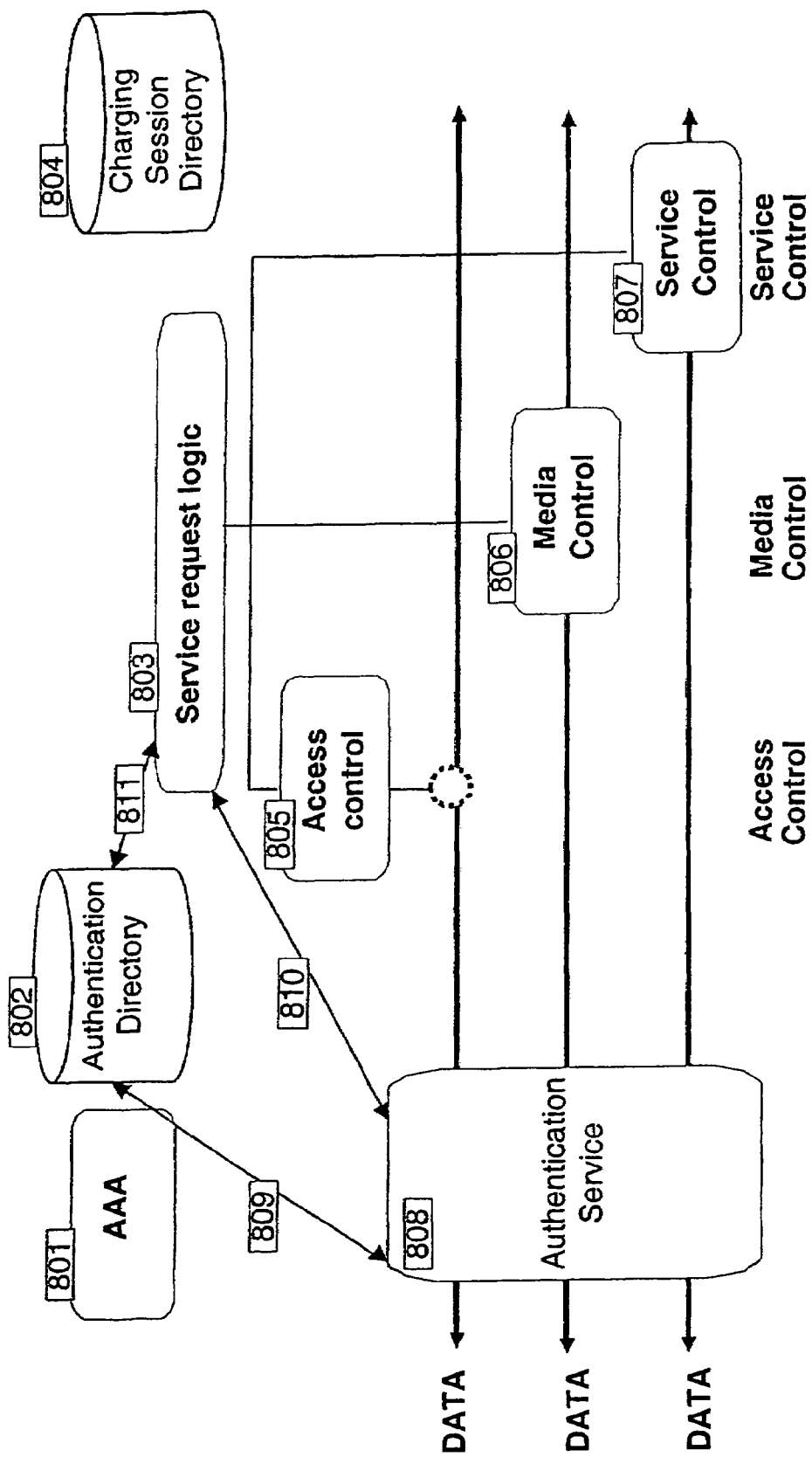
FIG. 8 presents an example of how an authentication and session synchronization can be done.

With reference to FIG. 6 (step 613), the system needs to identify the end user that is requesting for a service. It may also be required that the user needs to be authenticated and authorized. FIG. 8 is a schematic presentation of and example how the authentication can be done.

An Example of Authentication and Session Synchronization According to FIG. 8

With reference to FIG. 8, the end user can be authenticated with several different kind of network configurations. In many cases, the end users are authenticated with some centralized authentication service (808). With reference to step 809, end users authentication may include a RADIUS connection to an AAA server (801), which generates a reference directory (802) with, for example, user's IP addressing and end user session. This is a preferred procedure especially if all the proxy applications can utilize the same service. In this case, the proxy components (805, 806, 807) will deliver the IP addressing details to service request logic component (803). This component can further connect (811) to the AAA directory for verifying that the end user is authenticated.

An option for the above-described arrangement is that the service request logic component (803) itself includes authentication specific functionalities. This would mean that it could itself send authentication dialogs or for example certificated queries to the end user. This could be done either directly to authentication service (810) or via proxy applications (805, 806, 807).

Charging sessions need to be synchronized (804) in order to charge according to preferred charging models. The synchronization means that the service request logic (803) is able to identify which service request from different proxy applications (805, 806, 807) belong to the same service usage session. In case of centralized authentication service, this is a straightforward task. Each service charging session is checked for authentication information. If the referred id (for example IP address) is marked as authenticated the service charging session is associated with that end user session.

In case there is no separate authentication service, the system itself must include authentication functionality (808) in order to support the charging session synchronization.

Charging Model Selection

Figure 9:
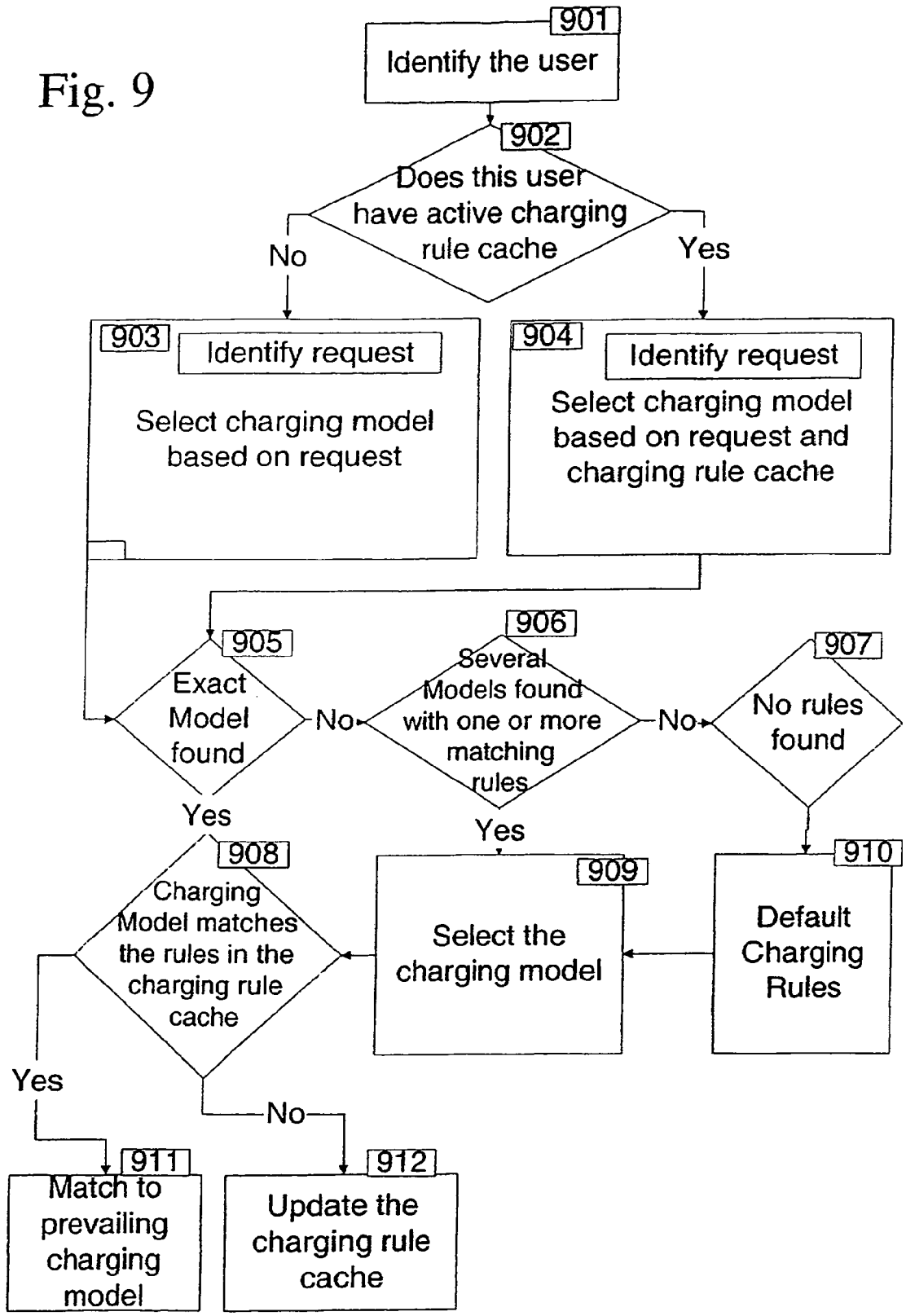
FIG. 9 presents a flow diagram of how a charging model can be selected.

With reference the flow chart presentation in FIG. 9, a mechanism of charging model selection is presented. Request identification presented in FIG. 6 described how it aims to identifying a user (613) and how the charging model is determined (614). These steps overlap with some steps in this presentation. Actually, the flow chart in FIG. 9 describes in more detail how the charging model selection is done.

Charging Model Selection According to FIG. 9

When the system has identified a user (901) and the service request from one of the proxies (601, 602, 603), the system starts to identify a correct charging model for the service request.

With reference to the steps in FIG. 9, the systems checks whether the end user has an active charging rule cache or not (902). If such is found, the system will examine the prevailing charging rules and use this information when trying to update the charging model in upcoming steps. During the step 904, the system will finalize the request identification. As described before, the request identification can be done already in some proxy application and request identification in this level merely means that request is mapped to some category.

If the system fails to find an active charging rule (903), the system will anticipated that it will try to match a charging model based only on the request. Both paths (903 and 904) lead to charging model matching steps (905, 906, 907). One Charging Model can consist of multiple charging requests from different proxy applications. The prevailing principle is that the system constantly tries to identify the closest matching charging model for the charging requests associated with a service usage session.

If the system finds an exact match (905), it continues to check the charging rule cache (908). However, if the system finds several candidates for charging model (906), if follows predefined rules in order to choose the closest matching model (909). If no rules are found (907), the system will use default charging rules (910) and select the charging model accordingly (909).

Next, the system will check the charging rule cache (908). All the charging rules associated with this particular end user session and service request need to be inline the matched charging model. If the cache is already in order (911), the system state will remain the same. However, if some rules are missing or some rules are no longer needed, the system will update the charging rule cache (912).

Charging models are defined in the system beforehand. FIG. 12 depicts a procedure for managing the charging rules and models.

Charging Model Correction

As described earlier with reference to FIG. 9, the charging of service requests in online environment can sometimes lead to marginal charging errors. This is because the charging requests from different proxy or control node applications may be received at different moments of time. On of the principles of online charging in these situations is that it always charges a service request based on the prevailing charging model in the charging rule cache. The cache is updated based on the newly incoming requests associated to the same service usage event.

Figure 10:
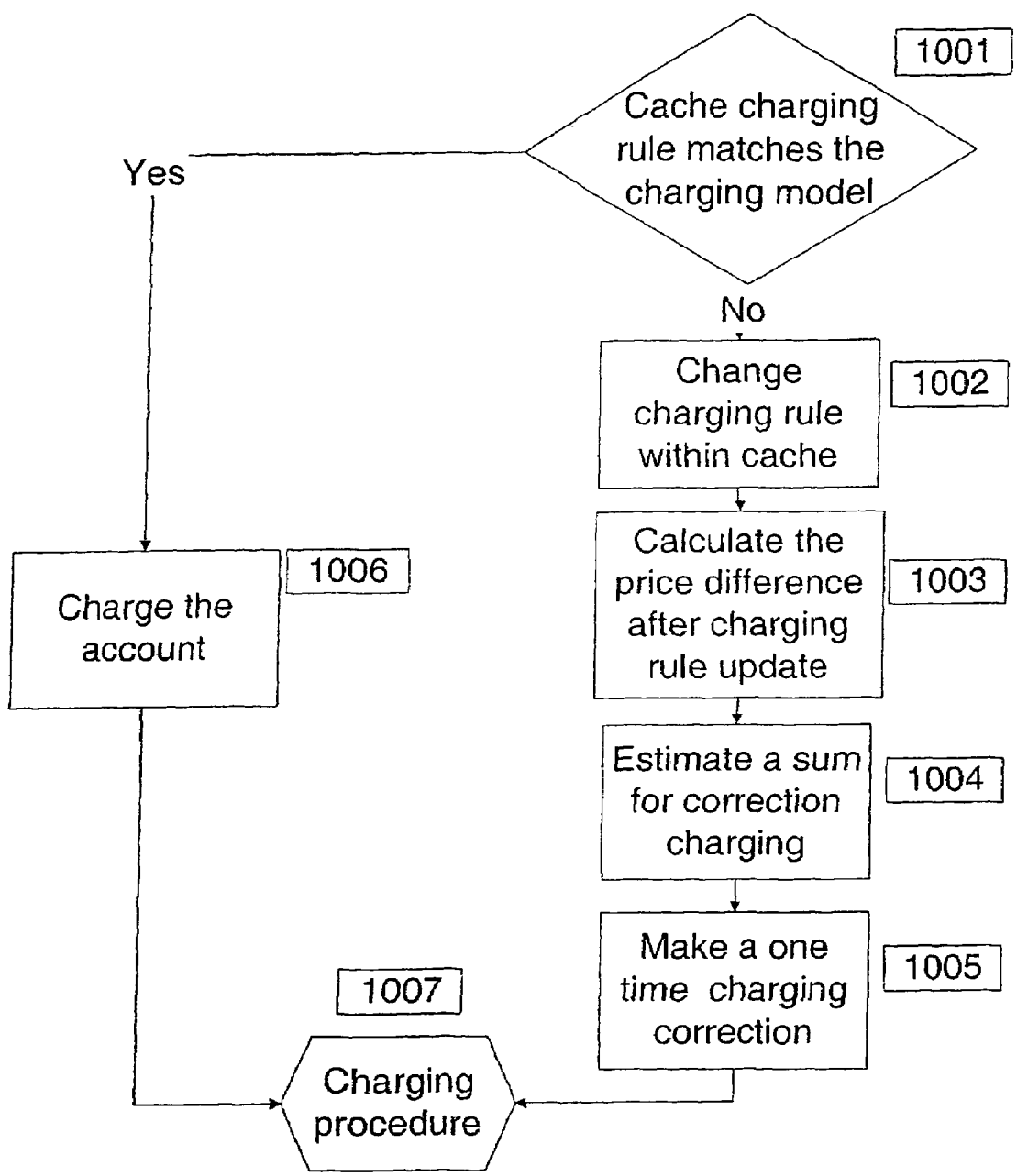
FIG. 10 presents a flow diagram of how a charging correction procedure works according to an embodiment of the invention.

In Order to Execute a One Time Charging Correction Each Time the Charging Rule Cache is Update (1001) a Charging Model Correction Mechanism is Introduced According the Flow Chart Presentation in FIG. 10

Each time the system notices that it must update the charging rule cache (1002), the system calculates (1003) a price difference related to this charging rule update and the previous charging rule. There are different types of basis for this calculation. It can be based on time and information of the likelihood of previous charging model being incomplete. The calculation may not be very exact and therefore some estimation may be needed (1004). Once the system has determined the amount of charging correction, it will execute a one time charging correction (1005).

In case there is no need to update the charging rule cache, the system will charge the account (1006) according to normal charging procedure (1007), which is also the end point of the correction procedure path.

Example of Charging Rule Handling

Following chapters describe an example of how online mediation can be used for building pricing models. The description refers to FIGS. 6 and 9.

Whenever the system has identified a charging model for a charging request it also checks whether the charging rule cache includes all necessary charging rules in order to support the charging model (908). This can be illustrated with an example.

If the system includes a charging model that states that a service request is charged item based plus there is an extra cost for the data volume, we need to build this type of charging model piece by piece. This is because the charging information originates from different sources namely different control nodes or proxy applications.

Item based charging information is obtained from service proxy (603) and volume information is obtained from access (601) proxy. The information flow within these two are not synchronized and therefore we need some means to combine them in order to comply with the defined charging model. The system may receive the first charging request either from the access proxy or from the service proxy. Let's assume that the first charging request comes from the access proxy. The fact that the invented system receives a charging request from the access proxy means that the proxy hasn't been provisioned service identification rules that restrict it from sending data based charging information.

The invented system receives the charging request from the proxy application and tries to match a charging model for it (614). The system notices that it can belong to several different charging models. Information is missing since some of the charging models suggest that access charging may be combined to some specific service request. The system selects a charging model that deals only with access charging or a model that is a combination of access and some service. The choice depends on how these are defined. Based on the selected charging model, the system initiates a charging rule cache session where a charging rule is defined (912). The cache session may also include information whether the charging model is complete or not.

Charging rule cache allocates a configured amount of monetary units in order to charge the access according to the one charging rule that is defined. Later on, the system will receive another charging request. This time it comes from the service proxy side (603). Again, the system tries to match a charging model (614) for the service and this time there is a perfect match for the service request identification rule. The match is a pricing model that combines item based and volume pricing. Now the system tries to find an active charging rule cache session for this particular end user. If such is found (as it is the case in this example) the system will update the charging rule within the charging rule cache (912) so that it corresponds the charging model. Now the updated charging rule can utilize the already allocated monetary balance in order to charge for the service according to the current charging model.

It should be noted that it is possible that the system has already charged a portion of the allocated charging rule cache according to the previous charging rule. This is ok and it reflects the nature of online functionality. The system should not wait forever for the charging model to be complete but more likely to charge according to prevailing charging rules. Whenever a new charging request updates the charging rules within the charging rule cache, the charging changes. However, with different time configurations and charging rule cache allocation it is possible to impact to the likelihood of charging precisely according to the charging model.

FIG. 11 Depicts the Handling of Service Identification Rule Provisioning

Identification Rule Provisioning

Runtime provisioning functionality also relates to supporting different pricing models. In the previous example it was described how charging rule cache and charging rules can be utilized for building charging models where we combine for example item and volume based pricing. More often it is needed that one or several of the proxy applications is configured not to send charging information to the system.

Whenever the invented system has matched a charging model for a service request (1101), the system will also check if this particular charging model contains some request identification activation rules (1102). If the charging model includes (1103) service request identification activation rules, the invented system will provision (1104) them to the correct locations (1105).

Service rule activation provisioning includes some challenges. The activation would most preferably be done for some specific end user and for some specific service session. This makes this very difficult. For example, access proxy would need to identify the end user and specific content service in order to omit the volume based charging information to be sent to the system. In some cases, such as when the access proxy is not able to identify the content service, this is not possible.

Service Management Provisioning

Service management is term for managing the lifecycle operations of service related data such as pricing plans, service profiles etc. The lifecycle operations include add, search, remove, modify and display functions.

Identification Rule Management According to FIG. 12

When adding new services (1201) to the system, there already exist some configurations of charging models. Chapter Building charging models describe the different type of charging models in more detail. Within the system these charging models are supported by mechanisms so in that sense it is possible to support many other charging models as well. However, for these presented and ready to choose from charging models the source and type of charging information is known and well defined. They involve definitions of certain proxy components and service identification rules.

When the administrator user adds a new service (1201) to the system, he selects a pricing plan (1202) for it. A pricing plan defines how the content service is priced and charged. It includes the charging model and price information for the charging model entities. For example, if the pricing model combines volume and time based pricing the pricing plan will enable the actor to enter price information for both of these charging model entities. Charging Model Management (1203) functionalities first checks the selected charging model. If the charging model includes static request identification rules (1204), they are activated (1205). Activation is done by provisioning (1208) the rules to system database, request identification cache and relevant proxy applications (1210).

There also exist dynamic request identification rules. These rules are not provisioned straight to the proxy applications but they are activated upon a service request. If the Charging Model Management notices that the selected charging model includes dynamic request identification rules (1206) it stores (1207) these rules to database and request identification cache (1209).

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of online charging in a communication network, the method comprising:
   receiving a service or identification request from a user;
   determining whether the service request relates to an access session, a media session or a service session;
   determining if a type of charging model the operator wants to use in connection with the service request is an event based model, a volume based model, a time based model, a subscription based model or a combination of the models;
   determining which network element corresponding to the access session, the media session or the service session in the communication network is responsible for charging the service relating to the service request from the user; and
   provisioning identification rules to the network element that is determined to be responsible for providing the service relating to the service request from the user,
   wherein the step of provisioning the identification rules comprises updating the rules when the access session, the media session and the service session interact with each other in a charging transaction relating to the service request from the user.

2. The method of claim 1, wherein the communication network includes an online mediation layer, a control logic layer below the online mediation layer, and a proxy layer below the control logic layer, and
   wherein the provisioning step is made from the online mediation layer to the control logic layer.

3. The method of claim 1, wherein the charging model includes at least one of a price source location, price types, a tariff class, and calculation rules.

4. The method of claim 1, further comprising:
   identifying the user requesting the service,
   determining if the identified user has preset charging rules; and
   determining if the preset charging rules of the user matches the provisioned identification rules.

5. The method of claim 4, further comprising:
   using the preset charging rules when the preset charging rules match the provisioned rules.

6. The method of claim 4, further comprising:
   updating the provisioned rules when the preset charging rules do not match the provisioned rules.

7. The method of claim 1, wherein the provisioned identification rules correspond to a particular user or to a specific service or service group.

8. The method of claim 1, further comprising:
   controlling a user session for providing the service requested by the user using one of a RADIUS, a Diameter or a CAMEL3 protocol.

9. The method of claim 1, further comprising:
   synchronizing charging transactions from one or more of the access session, the media session and the service session.

10. The method of claim 4, wherein the step of determining the type of charging model further comprises determining the type of charging model based on the service request and based on whether the identified user is determined to have the preset charging rule cache.

11. The method of claim 10, wherein the step of determining the type of charging model determines the charging model based on the service request and the user's preset charging rule cache when the identified user is determined to have the preset charging rule cache.

12. The method of claim 11, wherein the step of determining the type of charging model determines charging model based on the service request without using a preset charging rule cache when the identified user is determined not to have the preset charging rule cache.

13. The method of claim 1, further comprising checking if the particular charging model contains some request identification rules.

14. The method of claim 1, wherein in response of the charging model including service request activation rules, the system is triggered to provision them to correct locations.

15. The method of claim 1, wherein the request identification rules include one or several entities or any type of combination of them.

16. The method of claim 1, further comprising using dynamic request identification rules, which are not provisioned straight to the proxy applications but they are activated upon a service request.

17. A system for online charging in a communication network, the system comprising:
   a receiving unit configured to received a service or identification request from a user;

a determining unit configured to determine whether the service request relates to an access session, a media session or a service session, to determine if a type of charging model the operator wants to use in connection with the service request is an event based model, a volume based model, a time based model, a subscription based model or a combination of the models, and to determine which network element corresponding to the access session, the media session or the service session in the communication network is responsible for charging the service relating to the service request from the user, and a provisioning unit configured to provision identification rules to the network element that is determined to be responsible for providing the service relating to the service request from the user, wherein provisioning unit is further configured to update the rules when the access session, the media session and the service session interact with each other in a charging transaction relating to the service request from the user.

18. The system of claim 17, wherein the communication network includes an online mediation layer, a control logic layer below the online mediation layer, and a proxy layer below the control logic layer, and wherein the provisioning unit provision the identification rules from the online mediation layer to the control logic layer.

19. The system of claim 17, wherein the charging model includes at least one of a price source location, price types, a tariff class, and calculation rules.

20. The system of claim 17, further comprising:

an identifying unit configured to identify the user requesting the service, wherein the determining unit is further configured to determine if the identified user has preset charging rules, and to determine if the preset charging rules of the user matches the provisioned identification rules.

21. The system of claim 20, wherein the preset charging rules are used when the preset charging rules match the provisioned rules.

22. The system of claim 20, further comprising:

an updating unit configured to update the provisioned rules when the preset charging rules do not match the provisioned rules.

23. The system of claim 17, wherein the provisioned identification rules correspond to a particular user or to a specific service or service group.

24. The system of claim 17, further comprising:

a controlling unit configured to control a user session for providing the service requested by the user using one of a RADIUS, a Diameter or a CAMEL3 protocol.

25. The system of claim 17, further comprising:

a synchronizing unit configured to synchronize charging transactions from one or more of the access network session, the media session and the service session.

26. The system of claim 20, wherein the determining unit determines the type of charging model based on the service request and based on whether the identified user is determined to have the preset charging rule cache.

27. The system of claim 26, wherein the determining unit determines the type of charging model based on the service request and the user's preset charging rule cache when the identified user is determined to have the preset charging rule cache.

28. The system of claim 26, wherein the determining unit determines the type of charging model based on the service request without using a preset charging rule cache when the identified user is determined not to have the preset charging rule cache.

29. The system of claim 17, further comprising means for checking if the particular charging model contains some request identification rules.

30. The system of claim 17, further comprising means for in response of charging model including service request activation rules, triggering the system to provision to correct locations.

31. The system of claim 17, further comprising means for including one or several entities or any type of combination of them to the request identification rules.

32. The system of claim 17, further comprising means for using dynamic request identification rules, which are not provisioned straight to the proxy applications but they are activated upon a service request.

33. A method for setting identification criteria for online charging in communications networks, the method comprising:

receiving charging rule management request from an operator, and provisioning the identification rules according to a charging model including at least one of the following aspects:

which of the charging sessions including access/bearer, media and/or service sessions, the operator want to use for charging;

what kind of charging model the operator want to use within each session, subscription based, volume based, time based, event based and/or combination of previous models; and which network element is responsible for charging of which services;

wherein editing rules and taking into account if the charging of the service in one network element affect to the charging in at least one other network element.

34. The method of claim 33, wherein the provisioning is made from online mediation layer to control logic layer.

35. The method of claim 33, wherein in response of charging model including service request activation rules, the system is triggered to provision them to correct locations.

36. The method of claim 33, wherein the charging model contains at least one of the following items: Price source location, Price types, Tariff class, Calculation rules.

37. The method of claim 33, wherein the provisioning is made for a specific end user or user group.

38. The method of claim 33, wherein the provisioning is made for a specific service or service group.

39. The method of claim 33, wherein user sessions are controlled by RADIUS or Diameter or CAMEL3 protocol.

40. The method of claim 33, wherein charging transactions in a session are synchronized.

41. The method of claim 33, wherein request identification rules include one or several entities or any type of combination of them.

42. The method of claim 33, wherein the charging rule management request is one of the following operations: add, search, remove, modify, display.

* * * * *